(12) United States Patent
Chertok et al.

(10) Patent No.: US 9,076,074 B2
(45) Date of Patent: Jul. 7, 2015

(54) SYSTEM AND METHOD FOR PROCESSING A DIGITAL IMAGE

(75) Inventors: Michael Chertok, Petah Tikva (IL); Adi Pinhas, Hod Hasharon (IL)

(73) Assignee: Superfish LTD., Petah Tikva (IL)

( * ) Notice: Subject to any disclaimer, the term of this patent is extended or adjusted under 35 U.S.C. 154(b) by 499 days.

(21) Appl. No.: 13/461,556

(22) Filed: May 1, 2012

(65) Prior Publication Data
US 2013/0294691 A1 Nov. 7, 2013

(51) Int. Cl.
*G06K 9/62* (2006.01)

(52) U.S. Cl.
CPC .................................. *G06K 9/6204* (2013.01)

(58) Field of Classification Search
USPC ......... 382/173, 190, 195, 203, 305, 209, 217, 382/224
See application file for complete search history.

(56) References Cited

U.S. PATENT DOCUMENTS

| | | | | |
|---|---|---|---|---|
| 5,195,030 A * | 3/1993 | White | ........................ | 705/27.2 |
| 5,206,804 A * | 4/1993 | Thies et al. | .................. | 705/26.7 |
| 5,579,471 A * | 11/1996 | Barber et al. | ................. | 715/700 |
| 5,751,286 A * | 5/1998 | Barber et al. | ................. | 715/835 |
| 6,373,979 B1 * | 4/2002 | Wang | ...................... | 382/165 |
| 7,657,126 B2 * | 2/2010 | Gokturk et al. | .............. | 382/305 |
| 7,706,610 B2 * | 4/2010 | Zhang et al. | ................. | 382/173 |
| 8,315,442 B2 * | 11/2012 | Gokturk et al. | .............. | 382/118 |
| 8,732,025 B2 * | 5/2014 | Gokturk et al. | .............. | 705/26.1 |
| 2007/0122039 A1 * | 5/2007 | Zhang et al. | ................. | 382/199 |
| 2010/0135597 A1 * | 6/2010 | Gokturk et al. | .............. | 382/305 |

* cited by examiner

*Primary Examiner* — Ishrat I Sherali
(74) *Attorney, Agent, or Firm* — Pearl Cohen Zedek Latzer Baratz LLP

(57) ABSTRACT

A system and method for processing a digital image. A digital image and a definition of a segment therein may be obtained. A sampling area may be defined wherein the sampling area at least partly overlaps with the segment. A characteristic value for the sampling area may be determined The image may be represented based on the characteristic value. Other embodiments are described and claimed.

20 Claims, 7 Drawing Sheets

SYSTEM AND METHOD FOR PROCESSING A DIGITAL IMAGE

FIELD OF THE INVENTION

The present invention is generally related to digital image processing, and particularly to determining a relation between digital images.

BACKGROUND OF THE INVENTION

Representing digital images based on one or more characteristics is required in a variety of fields or scenarios. Detecting and/or identifying similarities between digital images is of great importance in numerous fields and applications in various industries. For example, when searching a database for a set of images that share one or more attributes, a similarity of images in the database may be determined or measured with respect to a reference image. Images may be represented based on an attribute or characteristic in order to accomplish such and other tasks.

For example, provided with a reference image, current systems and methods use various methods to determine one or more parameters or attributes of the input image (e.g., a color distribution histogram, color saturation etc.) and search for similar images in a repository of images by searching for images having the same (or similar) parameters or attributes.

However, current systems and methods suffer from a number of drawbacks. For example, determining attributes of an input image and of images in a repository may be time consuming and/or require considerable computational resources. Moreover, when searching for similar images based on attributes such as color distribution, current methods and systems often produce inadequate results, for example, based on a color distribution, an image of a blue sky may be considered similar to an image of a lake or an ocean.

SUMMARY OF EMBODIMENTS OF THE INVENTION

The present invention is related to representing digital images. A method for processing a digital image may include obtaining a digital image and a definition of a segment therein. A sampling area that is at least partly overlapping with the segment may be defined. At least one characteristic parameter and/or value of the sampling area may be determined. The image may be represented by the characteristic value or parameter. A sampling area may be defined to include at least one point of interest and/or local feature. A local feature may be determined in a sampling area. A size, shape and/or location of a sampling area may be modified. A plurality of sampling areas may be defined in an image. A distribution of a plurality of sampling areas may be based on a segment of the image and/or an object captured by the image.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

Figure 1:
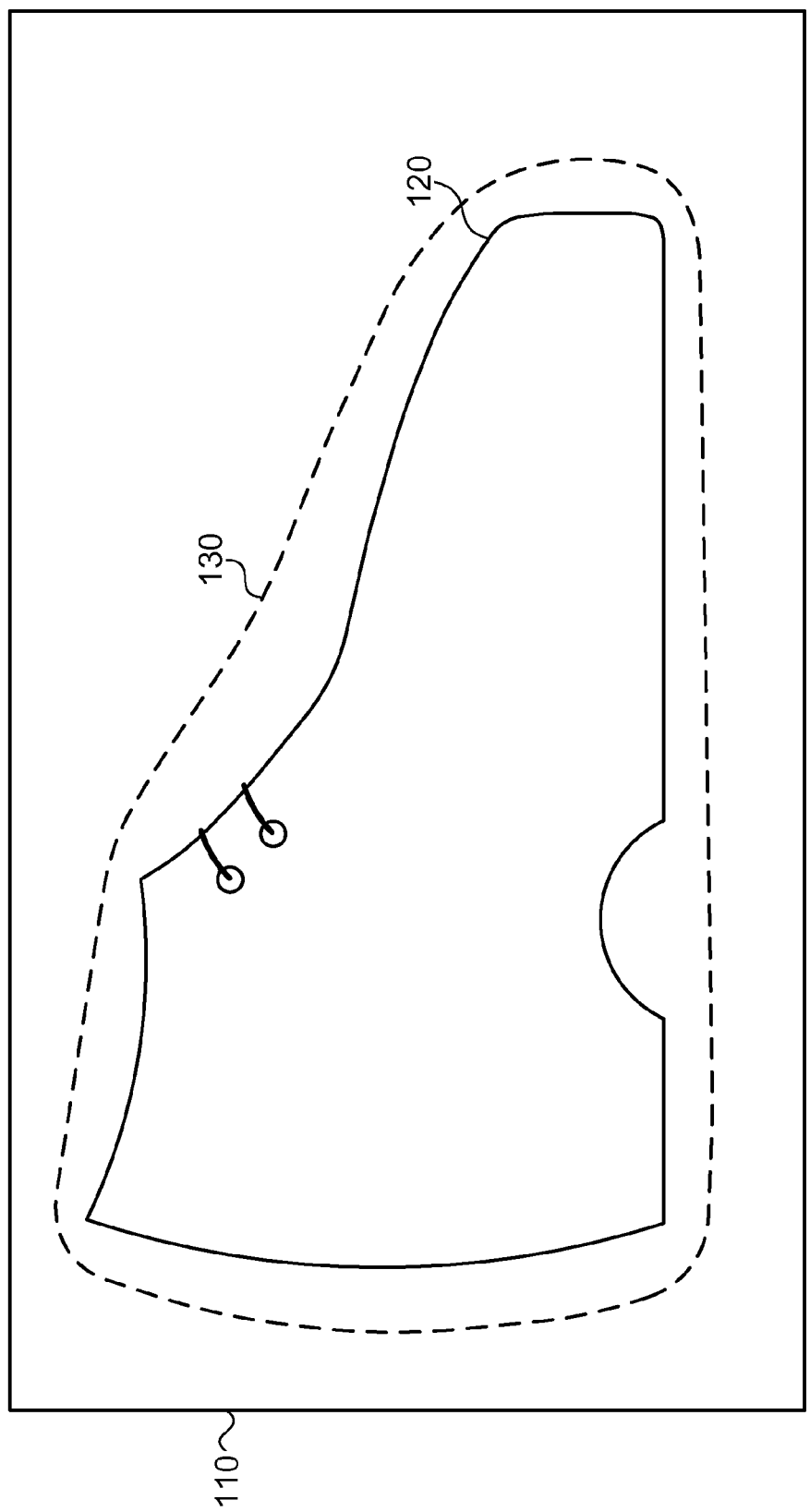
FIG. 1 shows a digital image and a definition of a segment according to embodiments of the present invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

Figure 7:
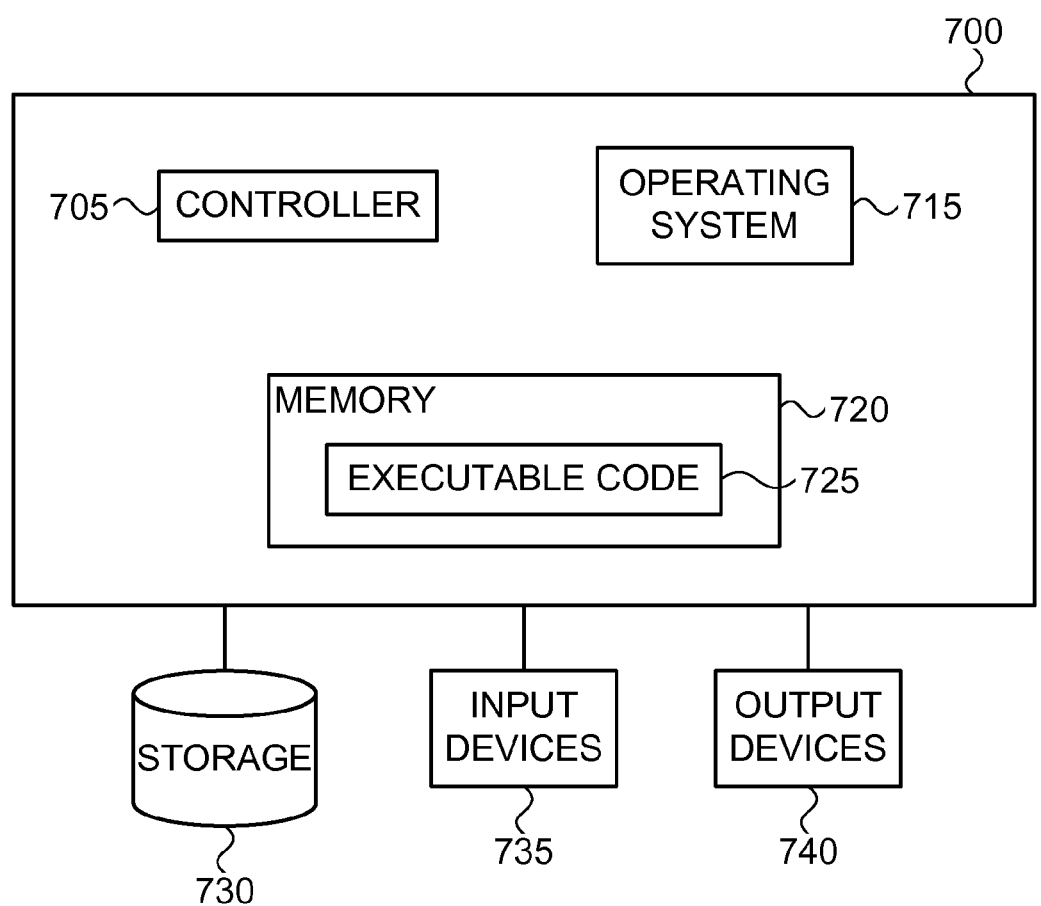
FIG. 7 shows high level block diagram of an exemplary computing device according to embodiments of the present invention.

Embodiments of the invention may include a computing device (e.g., as described herein with reference to FIG. 7). The computing device may determine, receive, or otherwise obtain a digital image and a definition of a segment therein. A segment of a digital image may include most or substantially all of an object captured in the digital image. The computing device may define one or more sampling areas in the digital image. The sampling areas may be defined, located, relocated, sized, resized or otherwise manipulated such that they at least partly overlap with the segment. Sub-segments, regions or sampling areas may be defined and/or manipulated (e.g., moved, rotated, resized, etc.) such that their areas intersect with an area of the segment. The computing device may determine at least one characteristic value for each of the at least one sampling area. The characteristics of the one or more sampling areas may be used to represent the digital image.

Reference is made to FIG. 1, which shows a digital image 110 and a definition of a segment 130 according to embodiments of the present invention. As shown by 120, an object (a shoe in this example) may be captured by an image. For example, a camera may be used to produce an image 110 of shoe 120. As referred to herein, the phrase "object included in an image" generally refers to any digital information used in order to represent the object. Likewise, the phrases like "segment of the image", "sampling area", "sub-segment" and "region" generally relate to a digital representation of these items (e.g., a set of pixels and associated data, or description of such set of pixels).

As shown by 130, a segment of image 110 may be defined such that object 120 is included in the segment. In some embodiments an object of interest may be only partly included in a segment, however, for the sake of clarity and simplicity, an object included in a segment is shown and mainly discussed herein. It will be apparent from the discussion herein that embodiments of the invention are applicable to cases where an object is not entirely included in a segment. A definition of segment 130 may be received by a computing device with or in association with image 110. For example, a set of pixels or coordinates defining segment 130 may be received, produced or otherwise obtained by a computing device.

Figure 2:
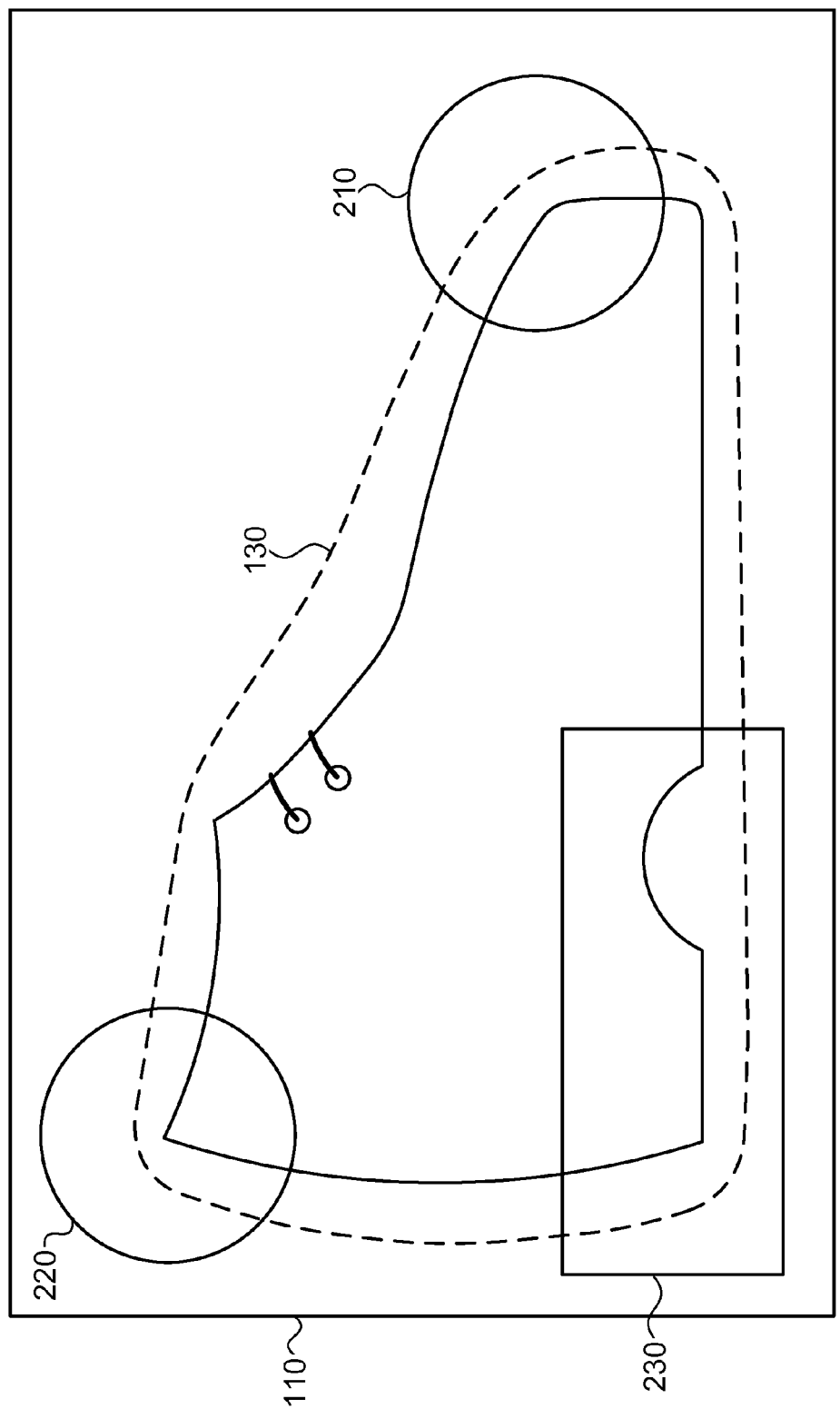
FIG. 2 shows a digital image and a number of sampling areas according to embodiments of the present invention.

Reference is made to FIG. 2, which shows digital image 110 and a number of sampling areas according to embodiments of the present invention. As shown by sampling areas 210, 220 and 230, one or more sampling areas may be defined such that their areas at least partly overlap with an area of segment 130. As shown, sampling areas, regions, sub-segments or portions may be defined in image 110 such that they intersect with segment 130. As shown, sampling areas may be of different shapes and sizes. Defining sampling regions or areas may be based on various considerations. For example, a rectangle sampling area 230 may be selected based on the curve of a border of segment 130 and/or the shape of segment 130. It will be understood that by referring to sampling areas intersecting with the segment 130, sampling areas wholly within segment 130 are clearly also contemplated.

Any applicable method or system may be used to define sampling areas such as 210, 220 and 230. For example, methods or techniques of image processing may be used in order to define sampling areas 210, 220 and 230 so that they include a point of interest. Generally, a point of interest (or an interest point) may be a region or a point (e.g., represented by coordinates or a single pixel) in an image. A point of interest is typically likely to be useful for subsequent processing, e.g., image matching or object recognition. Points of interest (or interest points) may be identified or detected using various techniques, e.g., corner detectors, blob detectors. In some embodiments, a point of interest may be a point or an area where at least one imaging parameter is identified. In other embodiments, a point of interest may be a region, a curve, or any applicable object. Points of interest may be defined and/or identified using any means, method or system. For example, known in the art interest point detectors or blob detectors such as the Harris, LoG, DoG, DoH, SUSAN, MSER may be used. It will be understood that any system or method may be used to determine, locate or identify a point of interest without departing from the scope of the present invention.

Although embodiments of the invention are not limited in this regard, the term "imaging parameter" used in this patent application specification should be expansively and broadly construed to include any data, parameter or information related to, or associated with, a digital image. For example, by analyzing imaging parameters, a point of interest may be determined or identified based on a sharp change of contrast, color, saturation etc.

Typically, imaging parameters, values or information may be associated with pixels in a digital image as known in the art. A pixel in a digital image may be associated with imaging parameters, values or levels of, e.g., hue, intensity, color, brightness, luminance, chromaticity, saturation levels of such imaging parameters or any other relevant data, parameters or values. Accordingly, it will be understood that any information that may be associated with pixels of a digital image or other imaging representations may be obtained, analyzed and/or processed by a system and/or method described herein. Embodiments of the invention may base a processing of an image on metadata, parameters or other information related to an imaging device, e.g., a color, intensity or a relation of pixels to size may be determined based on parameters of the imaging device used for acquiring or digitizing an image. Any information, e.g., parameters related to an acquisition device and/or a pre-processing applied to an image may be provided as metadata (e.g., separately from a pixel array) or they may be provided together with a digital image (e.g., in a singly file). For the sake of simplicity and clarity, image data such as pixels and metadata that may be associated with an image may be collectively referred to herein as imaging parameters.

Figure 3:
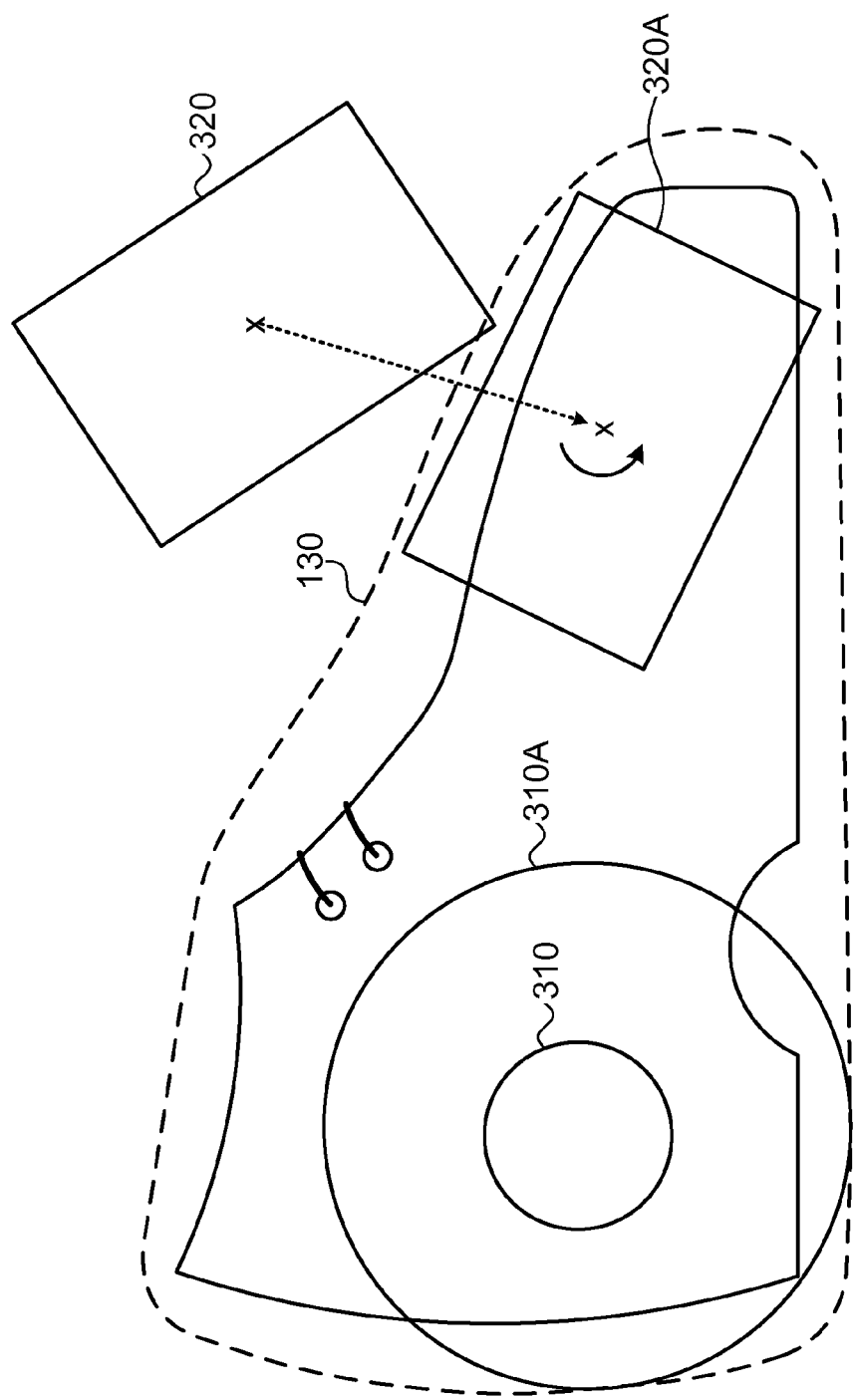
FIG. 3 graphically exemplifies manipulations of sampling areas according to embodiments of the present invention

Reference is made to FIG. 3, which graphically exemplifies manipulations of sampling areas according to embodiments of the present invention. According to embodiments of the invention, defining a sampling area may include defining any attribute of the sampling area. For example, a size, location, shape and/or orientation of a sampling area may be defined or altered. As shown, an initial sampling area 310 may be defined and may then be expanded as shown by sampling area 310A. For example, an initial sampling area may be extended such that it intersects with a larger portion of a segment. As described herein, sampling areas may be defined based on various considerations. In some cases, an initial set of sampling areas may be defined within a segment. Sampling areas in the set may then be extended such that they cover larger areas within the segment. For example, by covering larger portions of a segment, a sampling area may include more information related to an object included in the segment. In another embodiment, an initial sampling area may be defined to include an identified feature, e.g., an imaging parameter such as a specific color. However, additional processing may reveal that the specific color is also found in additional regions near the initial sampling area. In such exemplary case, the initial sampling area may be extended such that it includes the additional regions. As exemplified by 310 and 310A, an initial sampling area may be extended within the boundary of a segment. For example, an initial sampling area may be extended up to a point where it extends beyond a border of a segment.

A sampling area 320 may be defined and may then be rotated and moved as shown by sampling area 320A. For example, in one embodiment, preprocessing of an image may be performed (e.g., even prior to defining a segment 130) and points of interest or local features may be identified. For example, an embodiment of the invention may be provided with an image, a definition of a segment therein, and with a definition of points of interest, e.g., coordinates or references to pixels. Embodiments of the invention may define sampling areas that include the points of interest and may then manipulate the sampling areas such that they are substantially included in the segment. In some embodiments, sampling areas which are determined to be outside the segment may be removed or ignored. In other embodiments, sampling areas determined to be outside the segment (or intersecting with the segment only be a small fraction) may be moved, rotated or otherwise manipulated such that they are substantially included in the segment. For example, in order to better distinguish an object (e.g., included in a segment) from a background, it may be desirable to define a sampling area within the segment if a point of interest outside the segment is identified. For example, a sampling area may be defined such that it is as close as possible to the point of interest yet included in the segment. Any other manipulations may be applied to sampling areas, e.g., in order to ascertain at least a predefined portion of a sampling area intersects with a segment.

Figure 4:
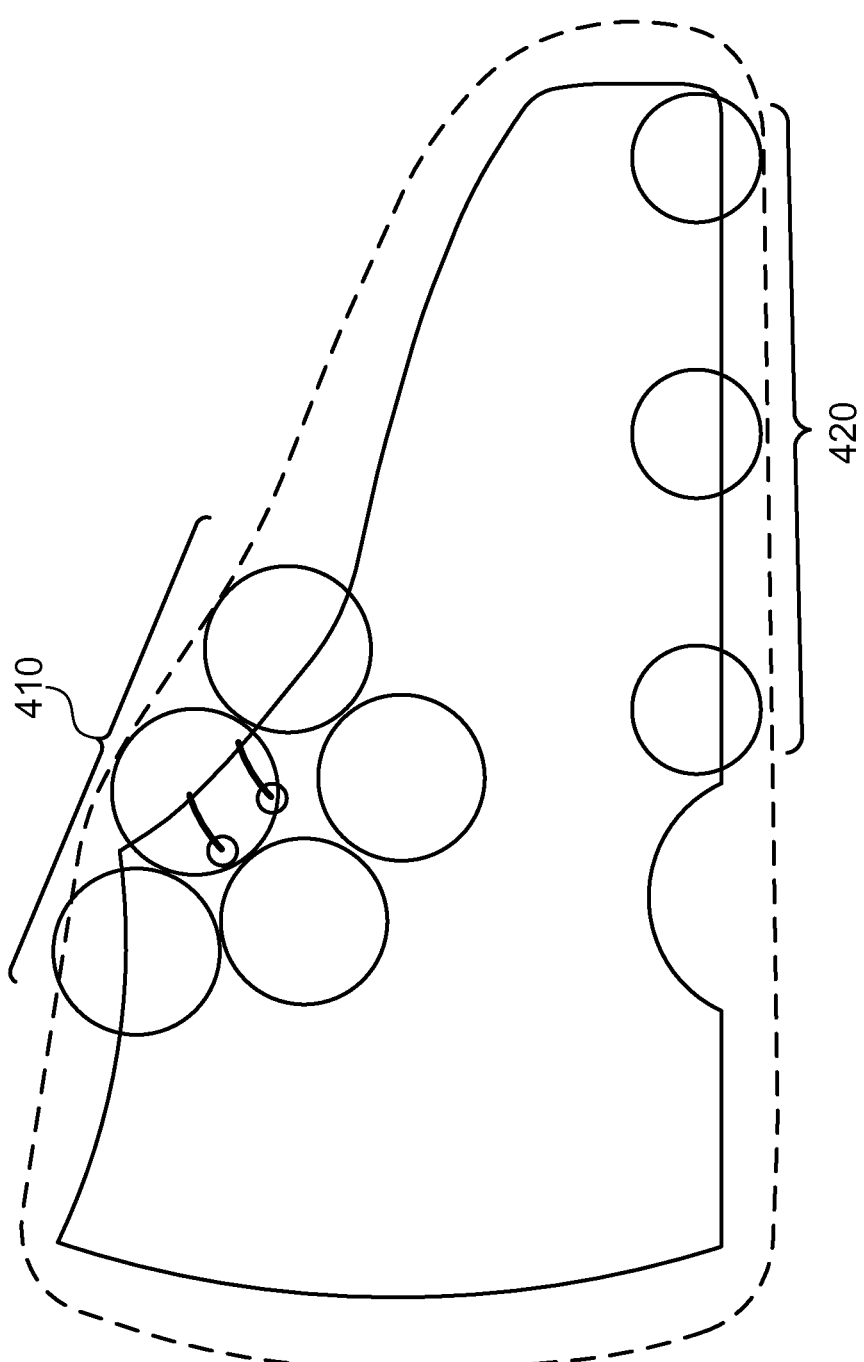
FIG. 4 shows a distribution of sampling areas according to embodiments of the present invention.

Reference is made to FIG. 4, which shows a distribution of sampling areas according to an embodiment of the present invention. A plurality of sampling areas may be defined in a segment. A distribution of a plurality of sampling areas in a segment may be based on any applicable parameter or data. For example, a distribution may be based on an attribute of the segment. For example, and as shown by 420, sampling areas may be evenly distributed along a border of segment 130. Sampling areas may be placed or distributed based on an attribute of an object included in the segment. For example and as shown by 410, sampling areas may be placed such that a region of an included object is substantially covered. For example, more sampling areas may be placed in a region based on identified features in the region. In an embodiment, an entire region of a segment may be covered with sampling areas and then the sampling areas may be examined. Next, it may be determined which of the sampling areas contribute information usable in subsequent processing. Sampling areas that do not contribute usable information may be removed. Accordingly, the arrangement of sampling areas as shown by 410 and 420 may be a result of any definitions, manipulations, removal or additions of sampling areas.

Figure 5:
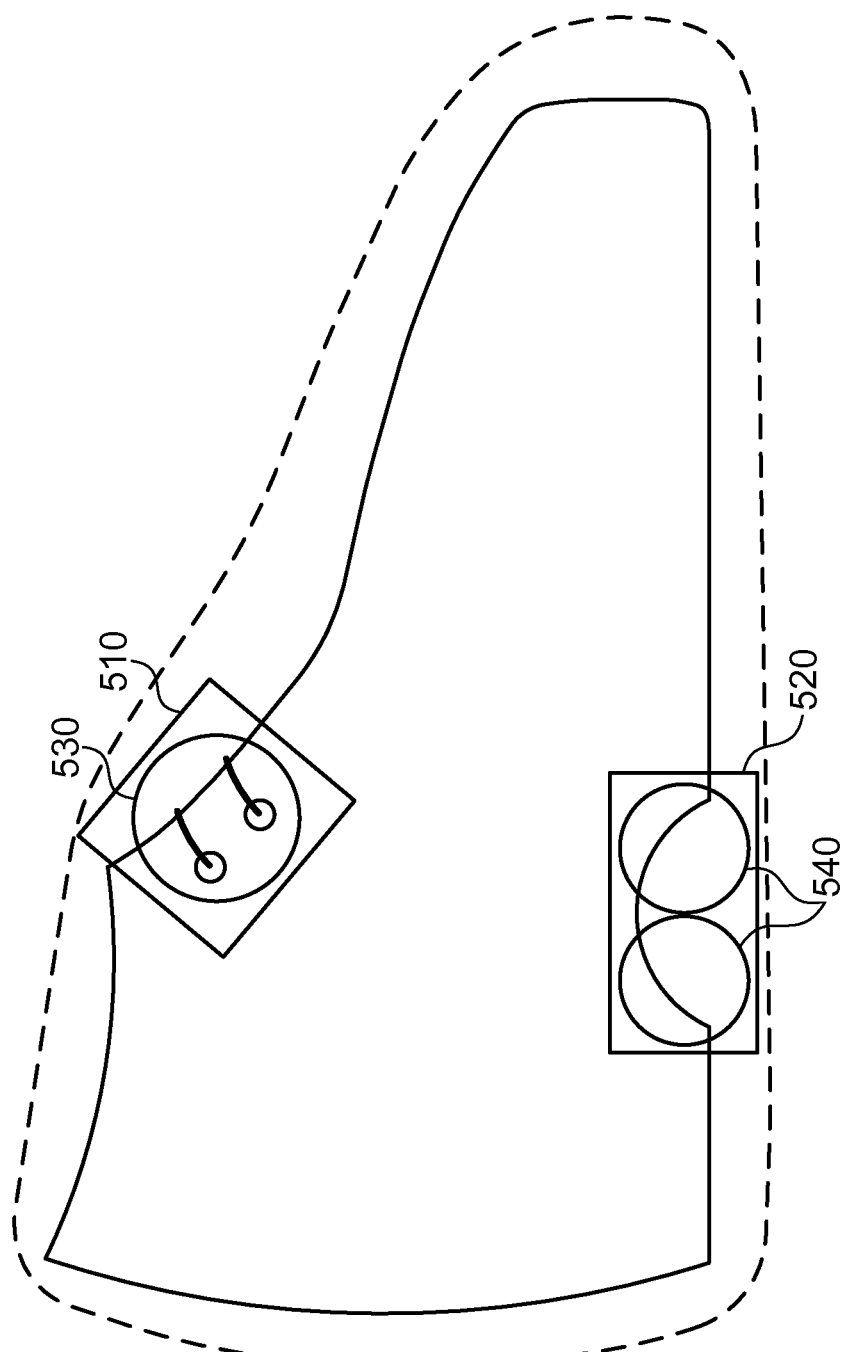
FIG. 5 shows a distribution of sampling areas according to embodiments of the present invention.

Reference is made to FIG. 5, which shows a distribution of sampling areas according to embodiments of the present invention. According to embodiments of the invention, defining a sampling area may include identifying a local feature and defining the sampling area such that it substantially includes the local feature.

Generally, a local feature may be any distinctive parameter in an image. For example, an imaging parameter such as color (or a change of color) in a small area may be considered a local feature. A local feature may be invariant, e.g., to scaling, rotation, noise or various permutations. In some cases, a local feature may be easy to define and, consequently, usable to match against a (possibly large) database of local features in a large number of images. As shown by 530, a local feature may be identified in a sampling area 510. In some embodiments, pixels or other data in a sampling area may be analyzed in order to detect local features. In other embodiments, local features may first be detected and sampling areas may be defined such that they include previously identified local features. For example, local features as shown enclosed by 540 may be identified and sampling area 520 may be defined such that it includes local features 540 as shown.

In some embodiments or cases, a local feature may be searched for, identified or detected within a previously defined (or manipulated) sampling area. For example, determining a characteristic value for a sampling area may include determining or identifying a local feature in the sampling area. For example, after defining sampling area 510, data associated with relevant pixels may be analyzed and a local feature (e.g., one or more imaging parameters which are specific to the shoe laces and holes) may be identified and determined to be a characteristic or local feature of sampling area 510. In some embodiments, based on an identified local feature or characteristic of a first sampling area, a second (typically smaller) sampling area may be defined. For example, after identifying local features in sampling area 510 as shown by 530, sampling area 510 may be modified to become sampling area 530. Similarly, rather than maintaining sampling area 520 an embodiment may only maintain the smaller sampling areas shown by 540. Accordingly, a sampling area may be modified based on a characteristic or local feature indentified with relation to the sampling area. In one example, a sampling area may be extended such that in includes a local feature that is only partially included in the sampling area.

According to embodiments of the invention, a relation between first and second digital images may be determined based on a representation of the digital images as disclosed herein. For example, first and second segments in the first and second images may be respectively defined, suitable segment areas may be defined, and the first and second images may be represented based on local features in the sampling areas. The first and second images may alternatively or additionally be represented based on a characteristic in a sampling area or based on any other relevant attribute of the sampling areas.

Figure 6:
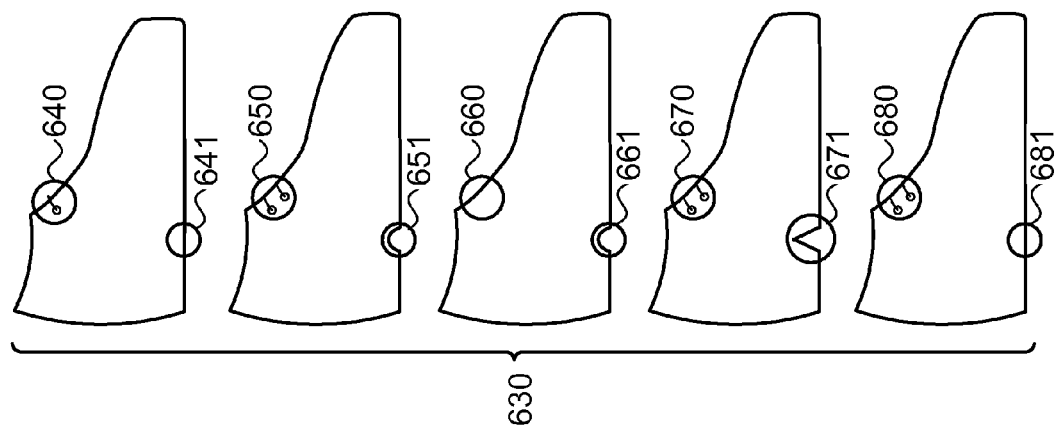
FIG. 6 shows relating an image to a set of images according to embodiments of the present invention.
Figure 6:
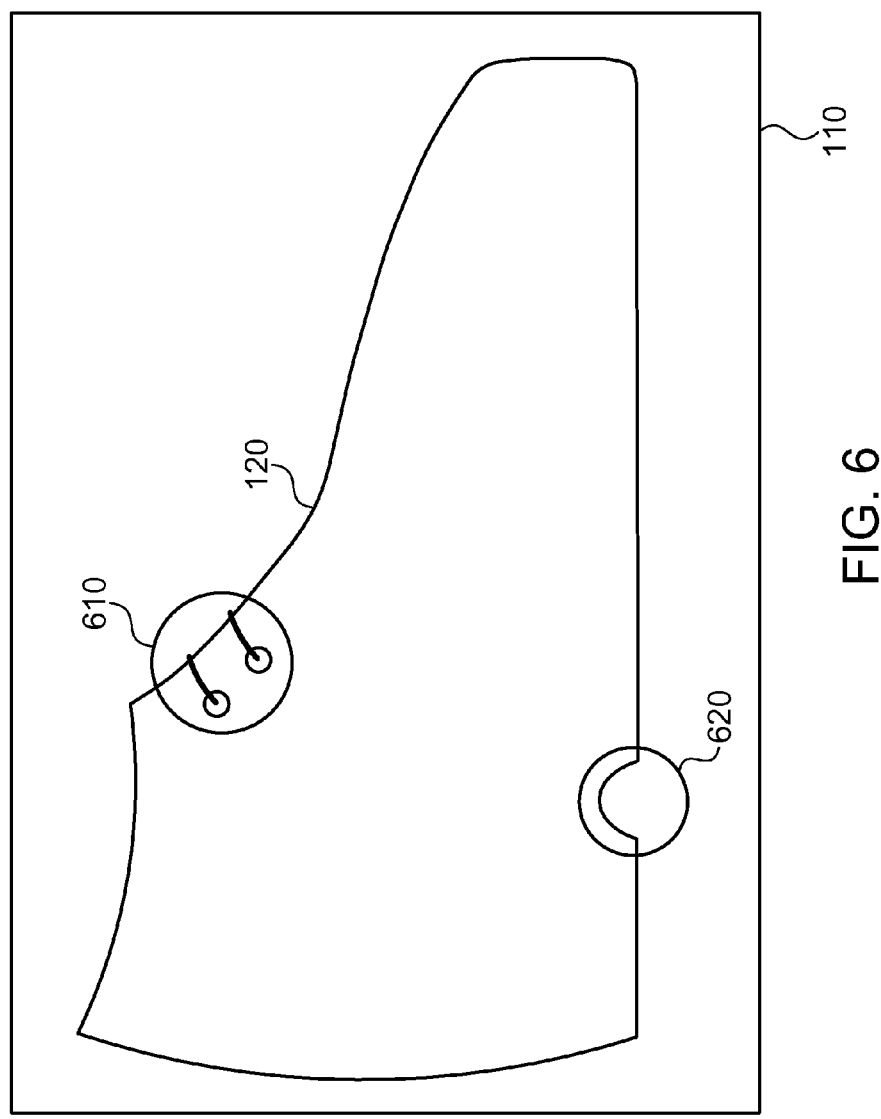

Reference is made to FIG. 6, which shows relating an image to a set of images according to embodiments of the present invention. As shown, sampling areas 610 and 620 in image 110 may be used to represent image 110. In some embodiments, sampling areas may be used in order to represent an object. For example, sampling areas 610 and 620 may be used to represent shoe 120. Representing an image or object based on one or more sampling areas may include representing the image or object based on a local feature or characteristic of a sampling area. For example, a local feature or characteristic in sampling area 610 determined based on the shape, color, location and/or other parameters related to the shoe laces and holes in sampling area 610 may be used to represent image 110 and/or shoe 120.

According to embodiments of the invention, a relation between first and second images may be determined by relating a characteristic of, or a local feature in, a sampling area in the first image to a characteristic of a corresponding sampling area in the second image. As shown, sampling areas corresponding to sampling areas 610 and 620 may be defined in objects or images 630. Relating image 110 to images 630 may include determining a match between image 110 and one or more images included in images 630. For example, a local feature in sampling area 610 may be compared or otherwise related to a local feature in corresponding sampling areas 640, 650, 660, 670 and 680. As shown only sampling areas 650, 670 and 680 may include or be otherwise associated with a local feature that is similar to the local feature in sampling area 610. Accordingly, images 650, 670 and 680 may be indicated as possibly similar to image 110.

A score or confidence level may be associated with a determined degree of similarity. For example, a first similarity score may be calculated based on comparing or relating a first set of sampling areas and a second (possibly higher) score may be associated to a similarity between images based on an additional relating of a second set of sampling areas. For example, after relating sampling area 610 to the corresponding sampling areas 640, 650, 660, 670 and 680, a score of zero ("0") may be associated with a similarity of image 110 to images 640 and 660. A score of one ("1") may be associated with a similarity of image 110 to images 650, 670 and 680.

Next (or at the same time) an additional similarity score may computed based on relating sampling area 620 to corresponding sampling areas 641, 651, 661, 671 and 681. A score of zero ("0") may be associated with a similarity of image 110 to images 670 and 680 and a score of one ("1") may be associated with a similarity of image 110 to images 640, 650 and 660. Accordingly, a similarity of image 110 with image 650 may be associated with a combined score of two ("2") based on the above calculated similarity scores. In the above example, a combined similarity score of image 110 with images 660, 670 and 680 may be one ("1") and a combined similarity score of image 110 with image 640 may be zero ("0"). Accordingly, a system may provide a user with images similar to an input image based on a level of similarity. Although a simplified example of calculating a similarity level or score based on the number of matching sampling areas is discussed herein it will be understood that other embodiments are contemplated. For example, a similarity score or confidence level may be based on a level of match of a local feature, a size, distribution or coverage of matching sampling areas etc.

Reference is made to FIG. 7, showing a high level block diagram of an exemplary computing device according to embodiments of the present invention. Computing device 700 may include a controller 705 that may be, for example, a central processing unit processor (CPU), a chip or any suitable computing or computational device, an operating system 715, a memory 720, a storage 730, an input devices 735 and an output devices 740.

Operating system 715 may be or may include any code segment designed and/or configured to perform tasks involving coordination, scheduling, arbitration, supervising, controlling or otherwise managing operation of computing device 700, for example, scheduling execution of programs. Operating system 715 may be a commercial operating system. Memory 720 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 720 may be or may include a plurality of, possibly different memory units.

Executable code 725 may be any executable code, e.g., an application, a program, a process, task or script. Executable code 725 may be executed by controller 705 possibly under control of operating system 715. Executable code 725 may perform operation described herein, e.g., define a sampling area in an image, identify a local feature or a characteristic in a sampling area, produce a representation of an image based a sampling area and compare or relate images based on data and/or attributes of corresponding sampling areas.

For example, executable code 725 may be an application that may receive an image and a definition of a segment in the image, define at lest one sampling area in the segment, determine a characteristic value for the sampling area and produce a representation of the image based on the characteristic value. Executable code 725 may compare or otherwise relate an image to a set of images. For example, a set of images may be stored in storage 730. Executable code may cause controller 705 to load a digital image from storage 730 into memory 720. Executable code may cause controller 705 to define at least one sampling area in the digital image, for example, the sampling area may at least partly overlap with the segment. Executable code may cause controller 705 to determine at least one characteristic value for the at least one sampling area. Executable code may cause controller 705 to produce a representation of the image based on the at least one characteristic value.

Storage 730 may be or may include, for example, a hard disk drive, a floppy disk drive, a Compact Disk (CD) drive, a CD-Recordable (CD-R) drive, a universal serial bus (USB) device or other suitable removable and/or fixed storage unit. Content (e.g., images 630) may be stored in storage 730 and may be loaded from storage 730 into memory 720 where it may be processed by controller 705.

Input devices 735 may be or may include a mouse, a keyboard, a touch screen or pad or any suitable input device. It will be recognized that any suitable number of input devices may be operatively connected to computing device 700 as shown by block 735. Output devices 740 may include one or more displays, speakers and/or any other suitable output devices. It will be recognized that any suitable number of output devices may be operatively connected to computing device 700 as shown by block 740. Any applicable input/output (I/O) devices may be connected to computing device 700 as shown by blocks 735 and 740. For example, a wired or wireless network interface card (NIC), a printer or facsimile machine, a universal serial bus (USB) device or external hard drive may be included in input devices 735 and/or output devices 740.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, a storage medium such as memory 720, computer-executable instructions such as executable code 725 and a controller such as controller 705.

Some embodiments may be provided in a computer program product that may include a non-transitory machine-readable medium, stored thereon instructions, which may be used to program a computer, or other programmable devices, to perform methods as disclosed herein. Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein. The storage medium may include, but is not limited to, any type of disk including floppy disks, optical disks, compact disk read-only memories (CD-ROMs), rewritable compact disk (CD-RWs), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices.

A system according to embodiments of the invention may include components such as, but not limited to, a plurality of central processing units (CPU) or any other suitable multi-purpose or specific processors or controllers, a plurality of input units, a plurality of output units, a plurality of memory units, and a plurality of storage units. A system may additionally include other suitable hardware components and/or software components. In some embodiments, a system may include or may be, for example, a personal computer, a desktop computer, a mobile computer, a laptop computer, a notebook computer, a terminal, a workstation, a server computer, a Personal Digital Assistant (PDA) device, a tablet computer, a network device, or any other suitable computing device. Unless explicitly stated, the method embodiments described herein are not constrained to a particular order or sequence. Additionally, some of the described method embodiments or elements thereof can occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method for processing a digital image based on distinguishing an object in the image, the method comprising:
   loading, from an image storage to a memory, a digital image and a segment defined therein, wherein the defined segment includes an object to be distinguished;
   defining at least one initial sampling area in the digital image, wherein the sampling area includes a point of interest in the image;
   manipulating at least one of a size, location, shape and orientation of the at least one initial sampling area to create a sampling area that is included in the defined segment;
   determining at least one characteristic value for said included sampling area by identifying a local feature in the included sampling area; and
   representing the digital image based on the at least one characteristic value.

2. The method of claim 1, comprising determining a relation between the digital image and an additional digital image based on the representation.

3. The method of claim 1, wherein the at least one initial sampling area is defined to include at least one point of interest.

4. The method of claim 1, wherein defining at least one initial sampling area in the digital image comprises identifying at least one local feature in the digital image and defining the sampling area to include the feature.

5. The method of claim 1, wherein manipulating the initial sampling area comprises defining a size of the included sampling area based on an attribute of the segment.

6. The method of claim 1, wherein manipulating the initial sampling area comprises defining a location of the included sampling area based on an attribute of the segment.

7. The method of claim 1, comprising creating a plurality of included sampling areas, wherein a distribution of the included sampling areas is based on at least one of: an attribute of the segment and an attribute of an object included in the segment.

8. The method of claim 1, comprising relating a characteristic of the included sampling area to a characteristic of a corresponding included sampling area in a second digital image to determine a relation between the digital image and the second digital image.

9. An article for processing a digital image based on distinguishing an object in the image, the article comprising a non-transitory computer-readable storage medium, having stored thereon instructions, that when executed on a computer, cause the computer to:
   load from an image storage to a memory a digital image and a segment defined therein, wherein the defined segment includes an object to be distinguished;
   define at least one initial sampling area in the digital image, wherein the sampling area includes a point of interest in the image;
   manipulate at least one of a size, location, shape and orientation of the at least one initial sampling area to create a sampling area that is included in the defined segment-,
   determine at least one characteristic value for said included sampling area by identifying a local feature in the included sampling area; and
   represent the digital image based on the at least one characteristic value.

10. The article of claim 9, wherein the instructions when executed further result in determining a relation between the digital image and an additional digital image based on the representation.

11. The article of claim 9, wherein the at least one initial sampling area is defined to include at least one point of interest.

12. The article of claim 9, wherein defining at least one initial sampling area in the digital image comprises identifying at least one local feature in the digital image and defining the sampling area to include the feature.

13. The article of claim 9, wherein manipulating the initial sampling area comprises defining a size of the included sampling area based on an attribute of the segment.

14. The article of claim 9, wherein manipulating the initial sampling area comprises defining a location of the included sampling area based on an attribute of the segment.

15. The article of claim 9, wherein the instructions when executed further result in creating a plurality of included sampling areas, wherein a distribution of the included sampling areas is based on at least one of: an attribute of the segment and an attribute of an object included in the segment.

16. The article of claim 9, wherein the instructions when executed further result in relating a characteristic of the included sampling area to a characteristic of a corresponding included sampling area in a second digital image to determine a relation between the digital image and the second digital image.

17. A system for processing a digital image based on distinguishing an object in the image, the system comprising:
   a storage configured to store at least digital images;
   a memory and a controller, wherein the controller is configured to:
      load a digital image and a definition of a segment therein from the storage into the memory, wherein the defined segment includes an object to be distinguished;
      define at least one initial sampling area in the digital image, wherein the sampling area includes a point of interest in the image;
      manipulate at least one of a size, location, shape and orientation of the at least one initial sampling area to create a sampling area that is included in the defined segment;
      determine at least one characteristic value for said included sampling area by identifying a local feature in the included sampling area; and
      represent the digital image based on the at least one characteristic value.

18. The system of claim 17, wherein the controller is to determine a relation between the digital image and an additional digital image based on the representation.

19. The system of claim 17, wherein the at least one initial sampling area is defined to include at least one point of interest.

20. The system of claim 17, wherein defining at least one initial sampling area in the digital image comprises identifying at least one local feature in the digital image and defining the sampling area to include the feature.

* * * * *